Figure 1:
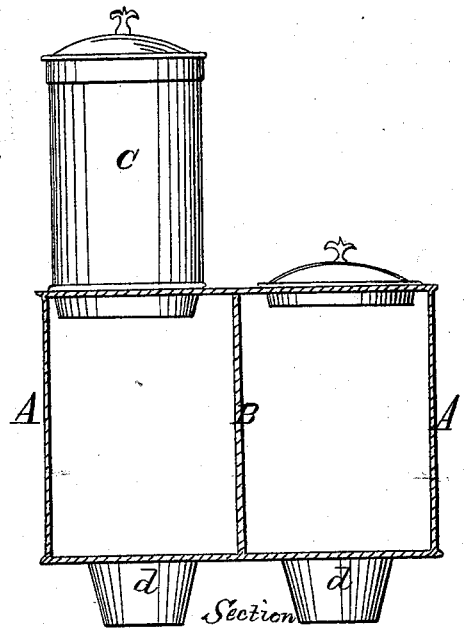
Figure 2:
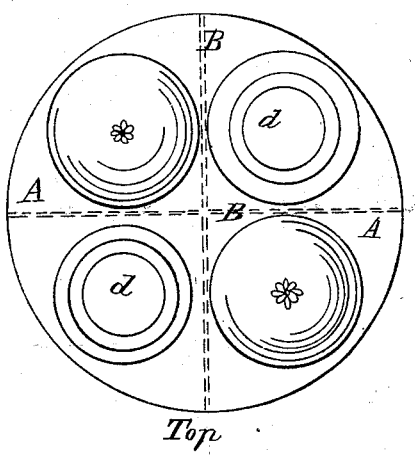
Figure 3:
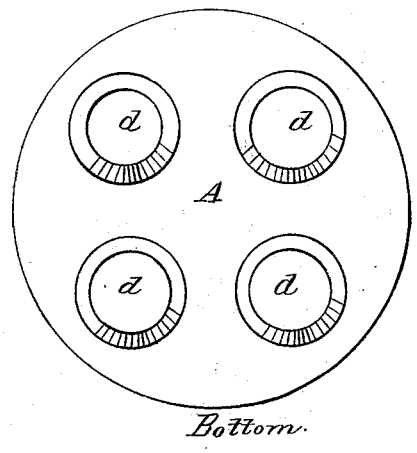

S. T. McDOUGALL.
Domestic Steamer.

No. 79,670.

Patented July 7, 1868.

Top.

Bottom.

Witnesses.
E. H. Smith
H. B. Brown

Inventor.
S. T. McDougall.

United States Patent Office.

S. T. McDOUGALL, OF BROOKLYN, NEW YORK.

Letters Patent No. 79,670, dated July 7, 1868.

PARTITIONED STEAMER.

The Schedule referred to in these Letters Patent and making part of the same.

TO ALL WHOM IT MAY CONCERN:

Be it known that I, S. T. McDOUGALL, of the city of Brooklyn, Kings county, State of New York, have invented an Improved Culinary Apparatus; and I do hereby declare that the following is a full, clear, and exact description thereof, reference being had to the accompanying drawing, which forms part of this specification.

My said invention has for its object the boiling and steaming of a number of different sorts of food with the same vessel, simultaneously, and with economy of time and fuel, with special reference to application to and use on gas and similar stoves, where the flame is concentrated in a limited space.

To this end I construct a vessel, A, with several partitions, B, dividing the interior vertically into several compartments, each of which has an opening at the top to receive a steamer, e, made in the usual manner.

The vessel A is generally made of the size ordinarily adapted to the pot-hole of a stove; and the bottom, instead of projecting downward therein, with a single depression corresponding to the size of such hole, is formed with several projections or depressions, d, corresponding to the number of compartments within the vessel A.

The result is, that when used on a gas-stove, or the like, the flame of a central burner, though tending to concentrate at the centre of the vessel, and therefore in the midst of the projecting or depressed bottoms, will also envelope all such bottoms, causing the bulk of liquid within the vessel A to boil much sooner than would be the case were the vessel not so divided.

Thus, by an economical arrangement of cooking-space, combined with a better distribution of and increased heating-surface, an ordinary meal, composed, if desired, of eight or more different sorts of viands, may be prepared in less time and with less fuel than generally consumed for one kind only, and the number of utensils required is reduced one-half.

I claim as my invention, and desire to secure by Letters Patent—

As an article of manufacture, a boiler divided into several compartments by vertical partitions, and provided with a depression in the bottom of each compartment, in combination with a steam-cooking vessel on one or each compartment, constructed and arranged in the manner and for the purpose herein described.

S. T. McDOUGALL.

Witnesses:
E. H. SMITH,
H. B. BROWN.